(12) United States Patent
Nagao

(10) Patent No.: US 10,838,390 B2
(45) Date of Patent: Nov. 17, 2020

(54) PROGRAM CREATION SUPPORT APPARATUS, CONTROL METHOD FOR PROGRAM CREATION SUPPORT APPARATUS, AND CONTROL PROGRAM FOR PROGRAM CREATION SUPPORT APPARATUS

(71) Applicant: OMRON Corporation, Kyoto (JP)

(72) Inventor: Kenjiro Nagao, Nagaokakyo (JP)

(73) Assignee: OMRON CORPORATION, Kyoto (JP)

( * ) Notice: Subject to any disclaimer, the term of this patent is extended or adjusted under 35 U.S.C. 154(b) by 15 days.

(21) Appl. No.: 16/135,779

(22) Filed: Sep. 19, 2018

(65) Prior Publication Data

US 2019/0018387 A1 Jan. 17, 2019

Related U.S. Application Data

(63) Continuation of application No. PCT/JP2017/014120, filed on Apr. 4, 2017.

(30) Foreign Application Priority Data

Apr. 4, 2016 (JP) .................................. 2016-075286
Mar. 31, 2017 (JP) .................................. 2017-072593

(51) Int. Cl.
*G05B 19/05* (2006.01)
*G06F 11/07* (2006.01)
*G06F 11/36* (2006.01)

(52) U.S. Cl.
CPC .......... *G05B 19/056* (2013.01); *G06F 11/079* (2013.01); *G06F 11/3656* (2013.01);
(Continued)

(58) Field of Classification Search
CPC ........ G05B 19/056; G05B 2219/13004; G05B 2219/13144; G05B 2219/13142; G05B 2219/13052; G06F 11/079; G06F 11/3656
See application file for complete search history.

(56) References Cited

U.S. PATENT DOCUMENTS

2004/0220684 A1 11/2004 Fukui
2012/0239941 A1* 9/2012 Ono ...................... G06F 21/121
713/189
(Continued)

FOREIGN PATENT DOCUMENTS

CN 100578437 C 1/2010
CN 104106015 A 10/2014
(Continued)

OTHER PUBLICATIONS

Database Compendex[Online]; Vandoren Vance J, "Software turns PCs into PLCs", Aug. 1997, p. 67, vol. 44, No. 11 (Database accession No. EIX97463840211); Engineering Information, Inc., New York, US; Relevance is indicated in the EESR dated Jun. 19, 2019.
(Continued)

*Primary Examiner* — Thomas C Lee
*Assistant Examiner* — Anzuman Sharmin
(74) *Attorney, Agent, or Firm* — Metrolex IP Law Group, PLLC

(57) ABSTRACT

A controller of a PC displays program elements of a ladder program and an electrical connection state thereof on a display, detects an instruction designating a first program element, determines whether the first program element is in an electrically connected state or an electrically disconnected state, specifies one or more causal elements according to whether the first program element is in an electrically connected state or an electrically disconnected state, and
(Continued)

displays the specified one or more causal elements on the display in a state discernible from other program elements.

8 Claims, 9 Drawing Sheets

(52) U.S. Cl.
CPC .............. *G05B 2219/13004* (2013.01); *G05B 2219/13052* (2013.01); *G05B 2219/13142* (2013.01); *G05B 2219/13144* (2013.01)

(56) References Cited

U.S. PATENT DOCUMENTS

| | | | |
|---|---|---|---|
| 2014/0304551 A1* | 10/2014 | Nakai | G06F 11/3692 714/38.1 |
| 2015/0234904 A1* | 8/2015 | Shiromoto | G05B 19/056 707/727 |
| 2015/0286204 A1 | 10/2015 | Yamaoka et al. | |

FOREIGN PATENT DOCUMENTS

| | | |
|---|---|---|
| CN | 104656543 A | 5/2015 |
| CN | 104813246 A | 7/2015 |
| JP | H4-286001 A | 10/1992 |
| JP | 2978260 B2 | 11/1999 |
| JP | 2009-122936 A | 6/2009 |
| JP | 2014-052763 A | 3/2014 |
| JP | 2016-4414 A | 1/2016 |
| KR | 2013-0100584 A | 9/2013 |
| WO | 2014/097379 A1 | 6/2014 |

OTHER PUBLICATIONS

Dimitrios Hristu-Varsakelis et al, "Handbook of Networked and Embedded Control Systems", Jan. 1, 2005, pp. 259-278, ISBN: 978-0-8176-4404-8, Birkhauser, Boston, MA; Relevance is indicated in the EESR dated Jun. 19, 2019.

The extended European search report ("EESR") dated Jun. 19, 2019 in a counterpart European Patent Application.

An English translation of the International Search Report of PCT/JP2017/014120 dated Jul. 4, 2017.

An English translation of the Written Opinion of PCT/JP2017/014120 dated Jul. 4, 2017.

The Chinese Office Action ("CNOA") dated Aug. 7, 2020 in a counterpart Chinese Patent Application.

* cited by examiner

FIG. 3

| Program element type | Disposition position (line number/ disposition order) | Variable |
|---|---|---|
| Type-A contact | 1/1 | X |
| Coil | 1/2 | A |
| Type-A contact | 2/1 | A |
| Coil | 2/2 | B |
| Type-A contact | 3/1 | B |
| Coil | 3/2 | C |
| Type-A contact | 4/1 | C |
| Coil | 4/2 | D |
| Type-A contact | 5/1 | D |
| Coil | 5/2 | E |

PROGRAM CREATION SUPPORT APPARATUS, CONTROL METHOD FOR PROGRAM CREATION SUPPORT APPARATUS, AND CONTROL PROGRAM FOR PROGRAM CREATION SUPPORT APPARATUS

CROSS-REFERENCES TO RELATED APPLICATIONS

This application is a continuation application of International Application No. PCT/JP2017/014120, filed on Apr. 4, 2017, which claims priority based on the Article 8 of Patent Cooperation Treaty from prior Japanese Patent Application No. 2016-075286, filed on Apr. 4, 2016 and prior Japanese Patent Application No. 2017-072593, filed on Mar. 31, 2017, the entire contents of all of which are incorporated herein by reference.

TECHNICAL FIELD

The disclosure relates to a program creation support apparatus for supporting creation of a ladder program.

RELATED ART

A method for sequence control of input devices or output devices by a programmable logic controller (PLC) may, as one example, be defined by a ladder diagram that is written in a ladder language. A ladder diagram has a configuration in which a logic circuit that is represented with contacts, coils and the like is drawn in a ladder shape, by joining two bus bars (left bus bar and right bus bar) that represent power and are drawn across an interval.

Conventionally, the above ladder diagram has been used in order to show a physical relay circuit as a logic circuit. On the other hand, in recent years, a program creation support apparatus for saving and editing sequence control that is defined with this ladder diagram has been developed as program data (hereinafter, referred to as a ladder program). The program creation support apparatus displays a ladder diagram corresponding to the ladder program on a display device or the like. For example, the following Patent Document 1 (JP 2016-004414A) discloses a technology for searching a ladder diagram for a circuit block having a coil that opens/closes a "contact" that is included in a search target block (block on the circuit having contacts and coils) designated by a user. The technology disclosed in Patent Document 1 improves the viewability of the ladder diagram, by specifying and displaying the hierarchal relationship between blocks through repetition of this search.

RELATED ART DOCUMENTS

Patent Documents

Patent Document 1: JP 2016-004414A (published Jan. 12, 2016)

SUMMARY OF THE INVENTION

Problems to be Solved by the Invention

However, with the technology described in Patent Document 1, in order to identify the original cause of a program element being in an electrically connected state or an electrically disconnected state, the user needed to visually work his or her way up, one program element at a time, starting from the program element above that program element in the ladder diagram. For example, in the case of debugging a ladder program or investigating the cause of a fault, reading back through the ladder diagram took time and effort on the part of the user, and was inefficient.

One or more aspects have been made in view of the above problems, and an object thereof is to realize a program creation support apparatus and the like capable of allowing a user to efficiently debug a ladder program or investigate the cause of a fault.

Means for Solving the Problems

In order to solve the above problems, a program creation support apparatus according to one or more aspects is a program creation support apparatus for supporting creation of a ladder program, including a storage configured to store a ladder program including a plurality of program elements, and a processor configured to read out the ladder program from the storage and execute the read ladder program, the processor being configured to display, on a display, a ladder diagram corresponding to the ladder program and whether each program element at a time of executing the ladder program is in an electrically connected state or an electrically disconnected state, in association with the ladder diagram, detect a user instruction selecting a first program element from the program elements displayed on the display, determine whether the first program element is in an electrically connected state or an electrically disconnected state, specify, according to whether the first program element is in an electrically connected state or an electrically disconnected state, one or more causal elements that cause the first program element to be in the electrically connected state or the electrically disconnected state, and display, on the display, the specified one or more causal elements in the ladder diagram in a state discernible from other program elements.

In order to solve the above problems, a control method for a program creation support apparatus according to one or more aspects is a control method for a program creation support apparatus that supports creation of a ladder program, the method including a processing step of reading out a ladder program including a plurality of program elements from a storage configured to store the ladder program and executing the read ladder program, and the processing step including a ladder diagram display step of displaying, on a display, a ladder diagram corresponding to the ladder program and whether each program element at a time of executing the ladder program is in an electrically connected state or an electrically disconnected state, in association with the ladder diagram, a detection step of detecting a user instruction selecting a first program element from the program elements displayed on the display, a determination step of determining whether the first program element is in an electrically connected state or an electrically disconnected state, a program element specification step of specifying, according to whether the first program element is in an electrically connected state or an electrically disconnected state, one or more causal elements that cause the first program element to be in the electrically connected state or the electrically disconnected state, and a program element display step of displaying, on the display, the one or more causal elements specified in the program element specification step in the ladder diagram in a state discernible from other program elements.

In order to solve the above problems, a control program for a program creation support apparatus according to one or more aspects is a control program for a program creation support apparatus that supports creation of a ladder program, the program including a processing step of reading out a ladder program including a plurality of program elements from a storage configured to store the ladder program and executing the read ladder program, and the processing step including a ladder diagram display step of displaying, on a display, a ladder diagram corresponding to the ladder program and whether each program element at a time of executing the ladder program is in an electrically connected state or an electrically disconnected state, in association with the ladder diagram, a detection step of detecting a user instruction selecting a first program element from the program elements displayed on the display, a determination step of determining whether the first program element is in an electrically connected state or an electrically disconnected state, a program element specification step of specifying, according to whether the first program element is in an electrically connected state or an electrically disconnected state, one or more causal elements that cause the first program element to be in the electrically connected state or the electrically disconnected state, and a program element display step of displaying, on the display, the one or more causal elements specified in the program element specification step in the ladder diagram in a state discernible from other program elements.

Effects of the Invention

According to one or more aspects, it becomes possible to allow a user to efficiently debug a ladder program or investigate the cause of a fault.

BRIEF DESCRIPTION OF THE DRAWINGS

FIG. 3 is a table illustrating a data configuration of program elements included in a ladder program.

EMBODIMENTS OF THE INVENTION

One or more embodiments relate to a FA (factory automation) system for centrally managing a production facility that is installed in a factory or the like, for example. One or more embodiments are related to a management system that illustrates, to a user, a connection relationship between input devices or output devices (henceforth, both are simply referred to as "devices") that are included in various types of production facilities, and an electrical connection state of the devices and constituent elements that are included in the devices when the FA system is operated. The input devices may be sensors, limit switches and the like. The output devices may be lamps, actuators and the like.

First Embodiment

Hereinafter, a first embodiment will be described using FIGS. 1 and 5. Conventionally, with a program creation support apparatus, in the case of searching for a contact that causes a certain program element (coil, etc.) to be in an electrically disconnected state, the user needed to visually work his or her way up through the program elements that are higher than that program element in the ladder diagram, and specifying the cause took time and effort. To search for the cause of a certain program element being in an electrically disconnected state, the user then needed to visually work his or her way sequentially through the blocks.

A PC 1 according to one or more embodiments which will be discussed below solves the above problems, and is capable of automatically specifying the cause of a specific program element of a ladder program being in an electrically disconnected state.

Main Configuration

Figure 1:
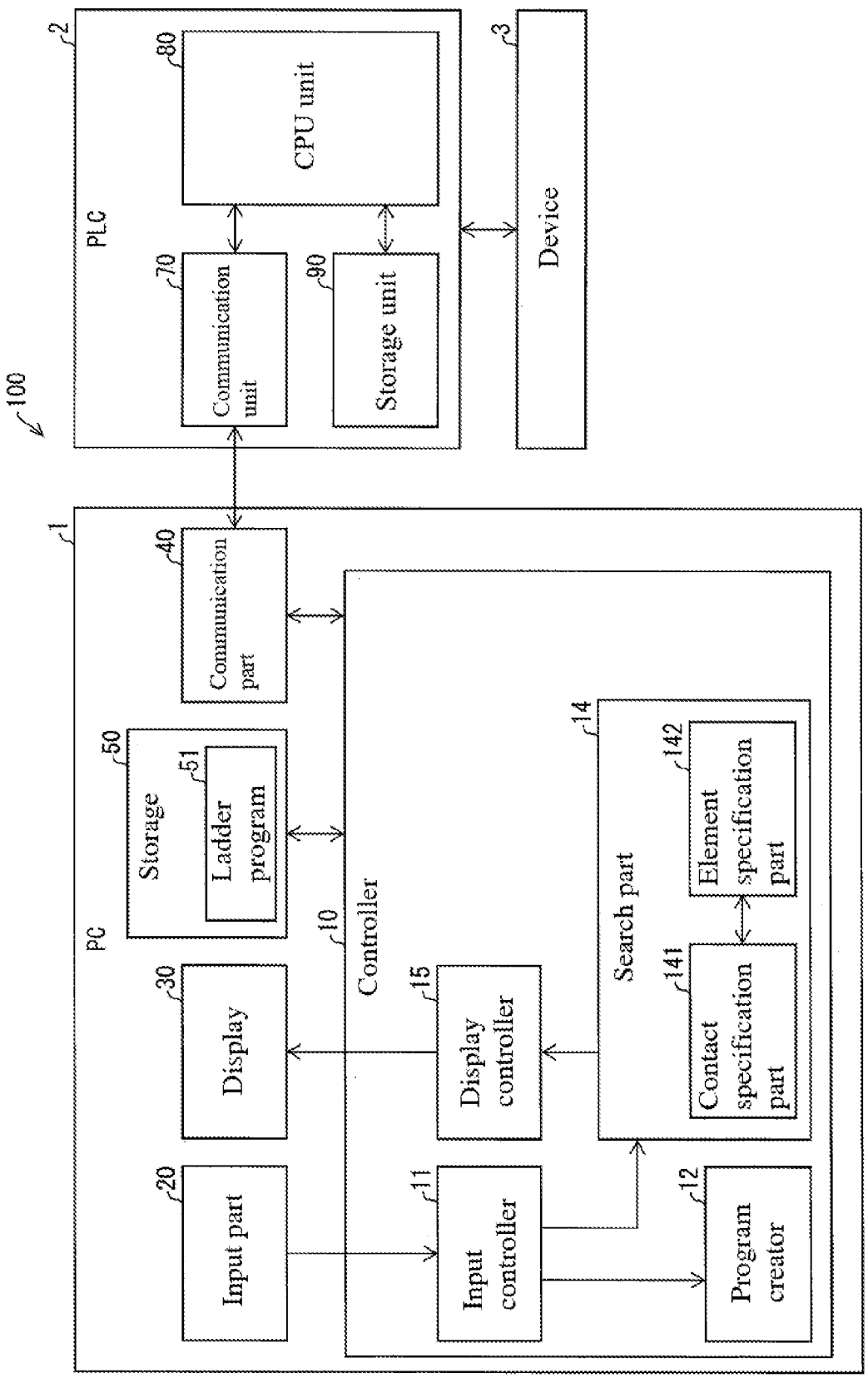
FIG. 1 is a block diagram illustrating the main configuration of a PC and a PLC according to a first embodiment.

FIG. 1 is a block diagram showing the main configuration of apparatuses that are included in a management system 100 according to one or more embodiments. The management system 100 includes a device 3, a programmable logic controller (PLC) 2 that centrally manages the device 3, and a PC (program creation support apparatus) 1 that monitors the connection relationship and the operating state of the device 3. The number of devices 3 that are connected to the PLC 2 is not particularly limited. The PLC 2 and the device 3 may be indirectly connected via a communication coupler or a slave apparatus.

Main Configuration of PLC 2

The PLC 2 is an apparatus that performs sequence control of the device 3. The PLC 2 operates in one of a program mode and an operation mode. The program mode is a mode in which the PLC 2 does not control the device 3. The PLC 2 operates in the program mode when performing data transmission and reception with the PC 1, for example. On the other hand, the operation mode is a mode in which the PLC 2 controls the device 3. The PLC 2, in the operation mode, executes a ladder program for controlling the device 3. The ladder program is a program written in a ladder language. The ladder program is created with the PC 1 and downloaded to the PLC 2.

The PLC 2, more specifically, includes a communication unit 70, a CPU unit 80, and a storage unit 90. The communication unit 70 is a unit for communicating with the PC 1. The storage unit 90 stores various types of data of the PLC 2. The storage unit 90 stores a ladder program 51, for example.

The CPU unit 80 performs overall control of the PLC 2. The CPU unit 80 switches the mode of the PLC 2. Also, the CPU unit 80 performs different processing in the program mode and the operation mode.

For example, in the program mode, the CPU unit 80 downloads the ladder program 51 from the PC 1. The CPU unit 80 stores the downloaded ladder program 51 in the storage unit 90.

On the other hand, in the operation mode, the CPU unit 80 performs sequence control of the device 3, by reading out the ladder program 51 from the storage unit 90 and executing this program.

Main Configuration of PC 1

The PC 1 is a program creation apparatus that creates the ladder program 51 describing a control method for the device 3, in response to an input operation by the user. The PC 1 is also a program creation support apparatus that supports creation of the ladder program 51. The PC 1 specifies whether the program elements at the time that the ladder program 51 is executed are in an electrically connected state or an electrically disconnected state, by executing the ladder program 51 that has been (or is being) created in the PC 1 in a virtual manner. Here, the program elements correspond to various types of components used when a ladder program is represented with a ladder diagram, such as contacts and coils. Note that instances of function blocks that collectively perform predetermined processing may also serve as program elements in a ladder program.

The PC 1 displays a ladder diagram corresponding to the ladder program 51 on a display (discussed later), and also displays the electrical connection state of each program element shown in this ladder diagram on the display (discussed later). The PC 1 is thereby able to present the ladder program 51 and the electrical connection state of the program elements to the user in an easily viewable manner. Accordingly, the PC 1 is able to support the creation of the ladder program 51 by the user.

The PC 1 is provided with a controller (processor) 10, an input part 20, a display 30, a communication part 40 and a storage 50. The input part 20 accepts input operations by the user. For example, the input part 20 is an input device such as a mouse or a keyboard incorporated in or connected to the PC 1. The input part 20 transmits input signals indicating the accepted input operations to an input controller 11 (discussed later) of the controller 10.

The display 30 is a display device incorporated in or connected to the PC 1. The display 30 displays the ladder diagram corresponding to the ladder program 51, in accordance with control by a display controller 15 (discussed later) of the controller 10. The communication part 40 is a communication device for the PC 1 to communicate with the PLC 2.

The storage 50 stores various types of data for the PC 1 to operate (control program for the PC 1 itself, etc.), and the ladder program 51 that has (or is being) created by the PC 1. The ladder program 51 is read out by the controller 10 in response to a predetermined instruction from the user, and transmitted to the PLC 2 via the communication part 40.

The controller 10 is a CPU (Central Processing Unit) that performs overall control of the PC 1. The controller 10 realizes the functional blocks of the input controller 11, a program creator 12, a search part 14 and the display controller 15 discussed below, by reading out the control program for the PC 1 that is stored in the storage 50 to a RAM (random access memory; not shown) or the like and executing this program.

The input controller 11 receives input signals from the input part 20, and detects instructions given to the PC 1 by the user from these signals. The input controller 11, in the case where an instruction related to creation of the ladder program 51 is detected, transmits information indicating the contents of the instruction to the program creator 12. Also, the input controller 11, in the case where an instruction related to display of the ladder program 51 (display of the ladder diagram) is detected, transmits information indicating the contents of the instruction to the display controller 15. Also, the input controller 11, in the case where an instruction selecting a program element that is included in the ladder diagram is detected, transmits information indicating the contents of the instruction to the search part 14.

The program creator 12 creates the ladder program 51 in accordance with the contents of the instruction received from the input controller 11. The program creator 12 stores the created ladder program 51 in the storage 50.

The search part 14, upon receiving an instruction selecting a program element from the input controller 11, determines whether the program element (hereinafter, referred to as the first program element) selected by the user is in an electrically connected state or an electrically disconnected state. A variable indicating one of binary values such as 0 and 1, true and false, or ON and OFF is allocated to the program element. The "electrically connected state" denotes a state in which the value of the variable allocated to the program element is 1, true or ON. On the other hand, the "electrically disconnected state" denotes a state in which the value of the variable is 0, false or OFF. The search part 14 specifies whether each program element is in an electrically connected state or an electrically disconnected state, by loading the value of the variable of the program element from the ladder program 51 and checking the loaded value. If the first program element is in an electrically disconnected state, the search part 14 goes back and searches for an electrically disconnected contact disposed higher in the ladder program 51 than the first program element. By repeating this search, the search part 14 is able to specify the contact that is causing the first program element to be in an electrically disconnected state (causal contact, one type of causal element). The search part 14, upon specifying the causal contact, transmits information indicating the causal contact to the display controller 15. The search part 14, more specifically, includes a contact specification part 141 and an element specification part 142.

Note that, in one or more embodiments, "higher" indicates that processing is executed earlier, when the ladder program 51 is executed.

The contact specification part 141, in the case where the first program element is in an electrically disconnected state, specifies a contact that is higher than the first program element and that, by being changed to an electrically connected state, will result in the first program element changing to an electrically connected state. Also, the contact specification part 141 specifies a contact that is higher than a program element specified as the starting point (search target) of the next search by the element specification part 142 discussed later, and that, by being changed to an electrically connected state, will result in the first program element changing to an electrically connected state. The contact specification part 141 conveys the specified contact to the element specification part 142.

The contact specification method of the contact specification part 141 is not particularly limited. For example, the contact specification part 141 specifies a contact that is where a certain program element and a connecting line are linked upstream of the program element and that is in an electrically disconnected state. Also, the contact specification part 141 may specify contacts (variables corresponding thereto) that are higher than the certain program element (upstream of the connecting line) from the dependency relationship of the program elements when the ladder program 51 is viewed as program data of a procedural language, and may further specify contacts that are in an electrically disconnected state from among these specified contacts.

The element specification part 142 specifies a program element that is upstream of the contact specified by the contact specification part 141 and that operates that contact (changes the contact to an electrically connected state), as the program element serving as the next search target. In other words, the element specification part 142 specifies a program element (coil, etc.) that, by being changed to an electrically connected state, is capable of changing the contact specified by the contact specification part 141 to an electrically connected state, as the program element serving as the next search target. The element specification part 142, in the case where the contact specified by the contact specification part 141 is a relay contact, specifies a coil corresponding to this relay contact (i.e., coiled allocated with the same variable as the relay contact) as the program element serving as the next search target. The element specification part 142 conveys the specified program element to the contact specification part 141.

The search part 14, by repeatedly performing specification of a contact with the contact specification part 141 and specification of a program element with the element specification part 142, thus works up from the first program element through the contacts and program elements in an electrically disconnected state that are higher in the ladder diagram. The search part 14, in the case where the contact specification part 141 or the element specification part 142 is no longer able to specify a contact or a program element that is in an electrically disconnected state, then specifies the contact specified immediately before as the causal contact. In other words, the search part 14 specifies the contact in an electrically disconnected state that was specified last time by the contact specification part 141 as the causal contact.

The display controller 15 displays the ladder diagram corresponding to the ladder program 51 and the electrical connection state of each program element on the display 30. The display controller 15 reads out the ladder program 51 from the storage 50, according to the contents of the instruction from the input controller 11, and displays the ladder diagram corresponding to the ladder program 51 on the display 30. The display controller 15, at this time, checks the logical form of the ladder program 51, and displays whether each program element at the time that the ladder program 51 was executed was in an electrically connected state or an electrically disconnected state on the display 30 in a discernible manner. The method of displaying the electrical connection state is not particularly limited, and, for example, the display controller 15 shows the user whether each program element and connecting line is in an electrically connected state or an electrically disconnected state, by displaying program elements that are in an electrically connected state and connecting lines joining program elements that are in an electrically connected state in a highlighted manner with thick lines, markings and the like.

The display controller 15, in the case where a causal contact is specified by the search part 14, further displays that causal contact on the display 30 in a manner discernible from other contacts in the ladder diagram. The method of displaying the causal contact is also not particularly limited, and, for example, the causal contact may be displayed in a highlighted manner with framing or shading, or the causal contact may be displayed with a different color from other contacts. Hereinafter, the display control that is performed by the display controller 15 will be specifically described using FIGS. 2 and 3.

Exemplary Screen of Display 30

Figure 2:
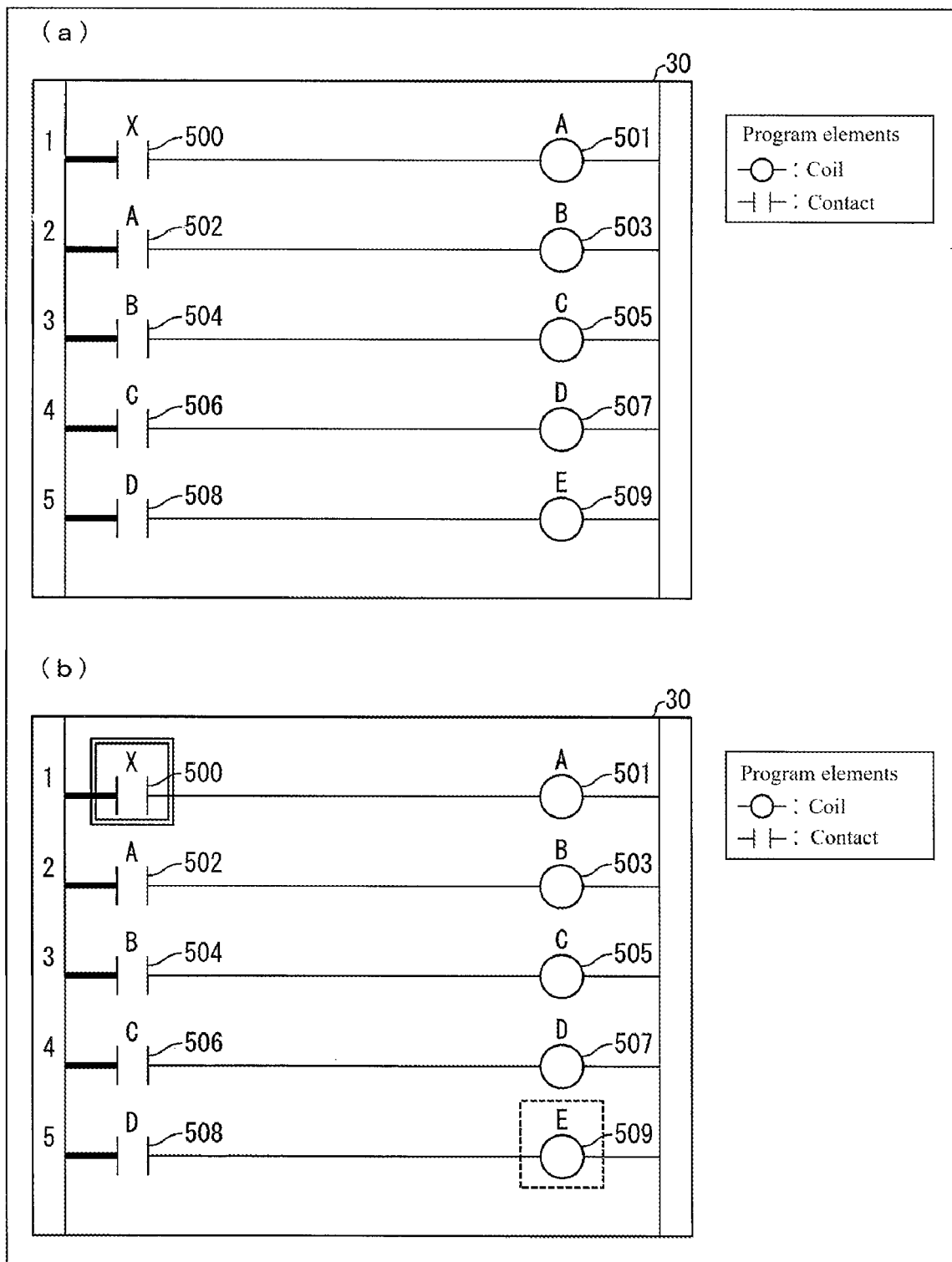
FIG. 2 is (a) a diagram illustrating a specific example of a ladder diagram that corresponds to a ladder program and is displayed on a display of a PC, and (b) a diagram illustrating a specific example of display related to an input operation and a result of a causal contact search in a ladder diagram.

(a) of FIG. 2 is a diagram showing a specific example of a ladder diagram corresponding to the ladder program 51. A ladder diagram of part or all of the ladder program 51 during execution by the PLC 2 is displayed on the display 30. In the example in (a) of FIG. 2, the first to fifth connecting lines of the ladder program 51 are displayed, and type-A contacts (normally open contacts; hereinafter, simply referred to as contacts) 500, 502, 504, 506 and 508 and coils 501, 503, 505, 507 and 509 are disposed (described) as program elements on respective lines. Note that the letter given to each contact and coil indicates the variable name of the variable allocated to that program element. Allocation of variables will be discussed in detail later.

Also, electrical connection and electrical disconnection of the program elements are displayed on the display 30 in a discernible manner. In the example in (a) of FIG. 2, the program elements are all in an electrically disconnected state. Also, the connecting lines are constantly in an electrically connected state from the left bus bar to the program element nearest the left bus bar. If the nearest program element is in an electrically connected state, the connecting line from that program element to the next program element will be in an electrically connected state. On the other hand, if the nearest program element is in an electrically disconnected state, the connecting line from that program element to the next program element will be in an electrically disconnected state. In the example in (a) of FIG. 2, program elements in an electrically connected state are filled in. Also, in the example in (a) of FIG. 2, the connecting lines that join program elements in an electrically connected state are displayed with a thick line. Subsequent diagrams showing ladder diagrams indicate the electrically connected state and the electrically disconnected state in a similar manner.

FIG. 3 is a table showing the data configuration of the program elements in the ladder program 51 of the ladder diagram shown in (a) and (b) of FIG. 2. Note that the data configuration of the program elements is not limited to the table shown in FIG. 3. Information specifying program elements such as shown in FIG. 3 is contained in the ladder program 51.

As shown in FIG. 3, the program elements are provided with attributes such as type (contact, coil, etc.) of program element, disposition position and variable. Here, a "variable" is a variable name having a predetermined model (Boolean in the case of a contact or coil, etc.), and the variable is allocated to a predetermined address in advance. According to FIG. 3, for example, the coil 501 which is the second program element on the first line of the ladder diagram and the contact 502 which is the first program element on the second line of the ladder diagram are different types of elements (coil and contact) and are allocated the same variable name (A). When the coil 501 turns ON, the contact 502 changes to an electrically connected state (value of the variable A of the contact 502 changes to 1, true or ON). In the case where the coil 501 operates, the contact 502 changes to an electrically connected state.

(b) of FIG. 2 is a diagram showing a specific example of display related to an input operation for a causal contact search and the result thereof in the case where such an input operation is carried out, in the ladder diagram shown in (a) of FIG. 2. When the user carries out an input operation selecting the coil 509, as shown in (b) of FIG. 2, the input part 20 accepts the input operation and sends a signal to the input controller 11. The input controller 11 specifies the selected program element (coil 509) from the signal, and conveys this program element to the search part 14. The search part 14 works through the program elements that are in an electrically disconnected state from the selected program element, by repeating the processing by the contact specification part 141 and the element specification part 142. In (b) of FIG. 2, the search part 14 works through the program elements sequentially from the coil 509 in order of the contact 508, the coil 507, the contact 506, the coil 505, the contact 504, the coil 503, the contact 502, the coil 501 and the contact 500. Since the element specification part 142 is not able to specify a further program element that is in an electrically disconnected state from the contact 500, the search part 14 specifies the contact 500 specified immediately before by the contact specification part 141 as the causal contact, and conveys this causal contact to the display controller 15. The display controller 15 displays the contact 500, which is the causal contact, in a manner discernible from other contacts and program elements such as coils, as shown in (b) of FIG. 2. Note that, as shown in (b) of FIG. 2, the display controller 15 may also display the program element (coil 509) designated as a search target by the user on the display 30 in a manner discernible from other program elements.

Processing Flow

Figure 4:
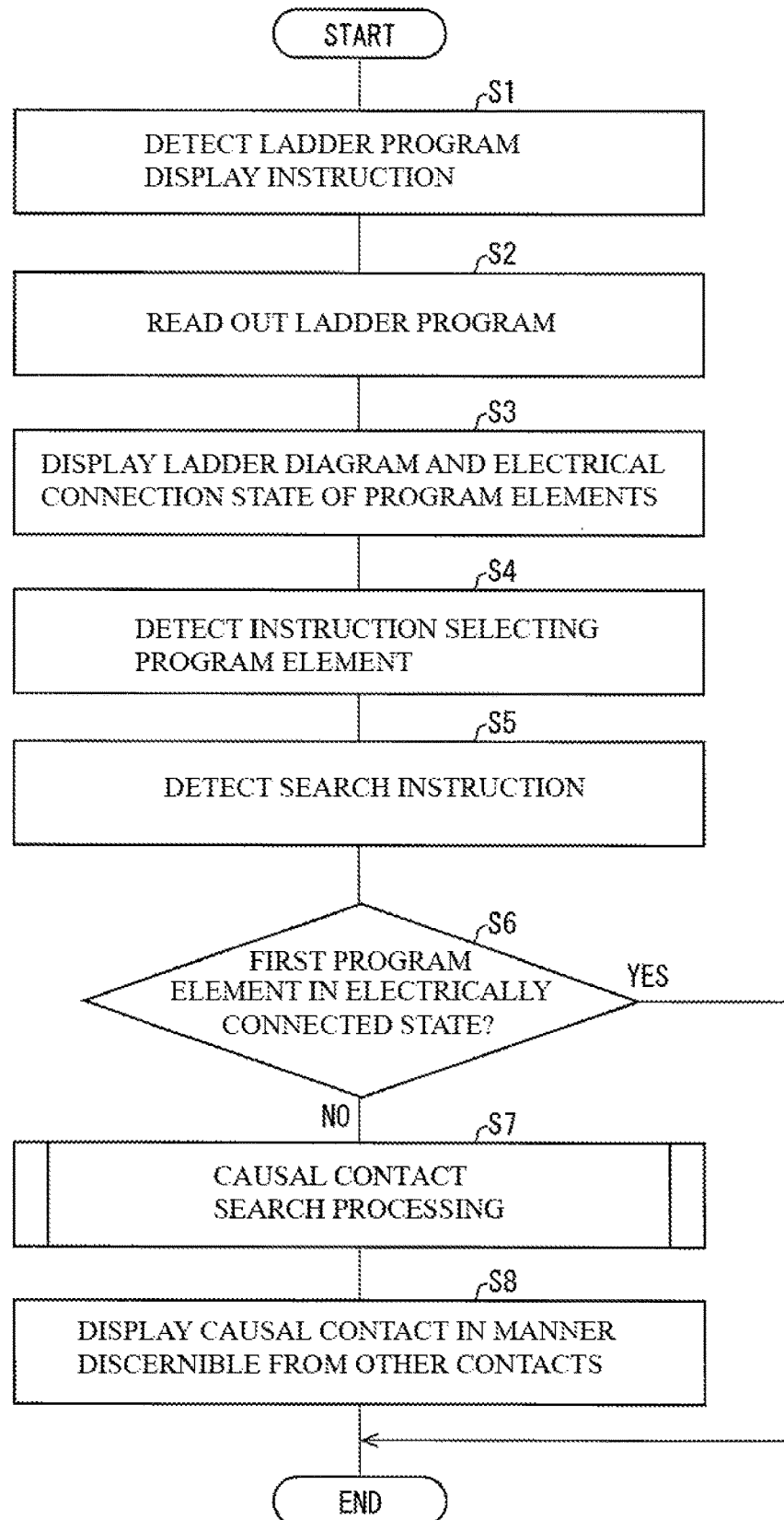
FIG. 4 is a flowchart illustrating an example of the overall flow of processing by a PC.

Finally, the flow of processing that is performed by the PC 1 will be described using FIGS. 4 and 5. FIG. 4 is a flowchart showing an example of the overall flow of processing by the PC 1.

As shown in FIG. 4, when an instruction indicating to display the ladder program 51 is detected by the input controller 11 of the controller 10 of the PC 1 (S1), the controller 10 reads out the ladder program 51 from the storage 50 (S2), and executes the following processing (processing step).

The display controller 15 displays the ladder diagram corresponding to this program, and the electrical connection state of the program elements that are included in the ladder program 51 on the display 30 (S3; ladder diagram display step). Here, when the user selects a program element on the ladder diagram, the input controller 11 detects an instruction selecting the program element by the user (S4; detection step), and conveys this instruction to the search part 14. Note that, in the case where an instruction (search instruction) indicating to search for the program element selected by the user as the search target is detected after detecting the above selection instruction (S5), the input controller 11 may convey this instruction to the search part 14. The search part 14, upon receiving this instruction from the input controller 11, determines whether the selected program element, that is, the first program element, is in an electrically connected state or an electrically disconnected state (S6; determination step). If the first program element is a program element in an electrically disconnected state (NO in S6), causal contact search processing is performed, by repeating the processing by the contact specification part 141 and the element specification part 142 (S7; search step). When the causal contact is specified, the search part 14 transmits information indicating the causal contact to the display controller 15. The display controller 15 displays the causal contact on the display 30 in a state discernible from other contacts (and program elements) (S8; program element display step). Note that, if the first program element selected by the user is a program element in an electrically connected state (YES in S6), the search part 14 need not perform the processing shown in S7 and S8. Alternatively, the search part 14 may display only the first program element on the display 30 in a state discernible from other program elements.

Next, the causal contact search processing in S7 of FIG. 4 will be described in detail, using FIG. 5. FIG. 5 is a flowchart showing the flow of the causal contact search processing. The search part 14, upon receiving information indicating a program element (first program element) specified by the user from the input controller 11, first specifies, with regard to the first program element, whether the element type is a contact or a program element other than a contact (S50).

If the program element is a contact (YES in S50), the search part 14 specifies, with the contact specification part 141, a contact that is higher than the first program element and that, by being changed to an electrically connected state, will result in the first program element changing to an electrically connected state, as the starting point of the next search (S52). On the other hand, if the first program element is not a contact (NO in S50), the search part 14 specifies, with the element specification part 142, a program element that is higher than a contact and that operates the contact (changes the contact to an electrically connected state), as the starting point of the next search (S54). The search part 14 repeats the processing of S50 to S54 until the contact specification part 141 is no longer able to specify a contact or the element specification part 142 is no longer able to specify a program element from a contact (until the specification processing of S52 or S54 fails) (NO in S56). When specification by the contact specification part 141 or the element specification part 142 fails (YES in S56), the search part 14 specifies the contact specified immediately before by the contact specification part 141 as the causal contact (S58; program element specification step).

Figure 5:
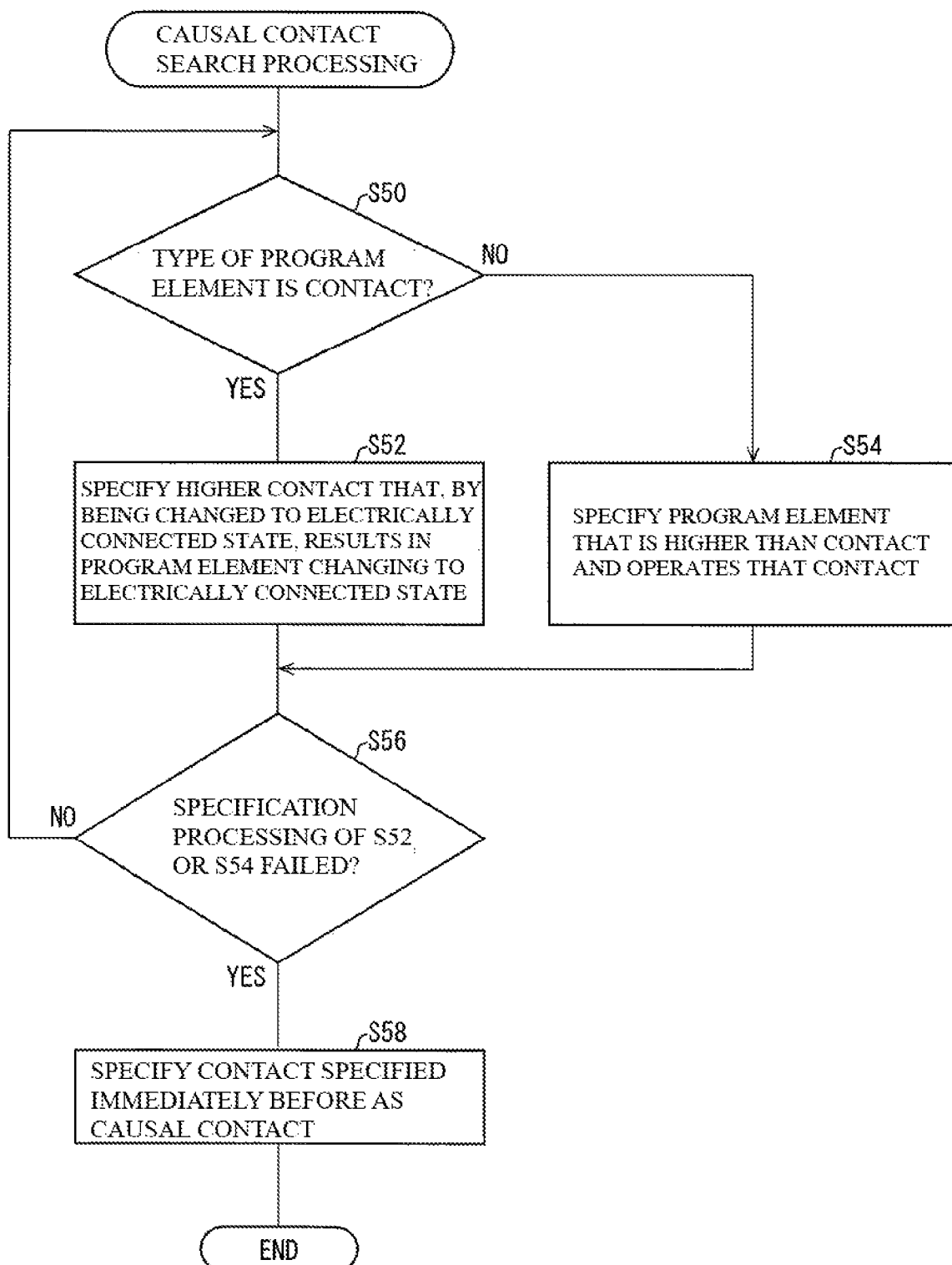
FIG. 5 is a flowchart illustrating an example of a flow of causal contact search processing that is performed by a PC.

In this way, according to the processing shown in FIGS. 4 and 5, the PC 1 is able to automatically search back through the contacts that are in an electrically disconnected state from the first program element selected by the user, specify the causal contact that originally caused the first program element to be in an electrically disconnected state, and indicate the causal contact to the user. Accordingly, an effect of being able to automatically specify the cause of a specific program element of the ladder program 51 being in an electrically disconnected state and show the user is achieved.

Note that the display controller 15 may display the ladder diagram of program elements that exist between the program element designated by the user and the causal contact in a compressed (reduced) manner, such that the designated program element and the causal contact fit on one screen of the display 30.

For example, the display controller 15 may display the connecting line on which the program element designated by the user is disposed and one connecting line on either side thereof, and also, with regard to the causal contact, display the connecting line on which the causal contact is disposed and one connecting line on either side thereof, and omit the connecting lines therebetween such that the program element designated by the user and the causal contact fit on one screen. Also, for example, the display controller 15 may display the connecting lines therebetween and the program elements disposed thereon in a reduced manner such that the program element designated by the user and the causal contact fit on one screen.

Since the user is thereby able to check program elements that are in an electrically disconnected state whose cause he or she wants to identify and the causal contacts that cause the electrical disconnection without needing to scroll or switch screens of the display 30, convenience in searching for causal contacts is improved.

In one or more embodiments, the search part 14 specifies a causal contact. However, the search part 14 of the PC 1 according to one or more embodiments may, in the case where the contact specification part 141 or the element specification part 142 is no longer able to specify a program element serving as a further search target, specify the program element specified immediately before as a causal element that causes the first program element to be in an electrically disconnected state, rather than only a contact. The display controller 15 may then display this causal element on the display 30 in a state discernible from other program elements.

Alternatively, the search part 14 may specify, as the causal element, the program element specified immediately before (last time) by the contact specification part 141 or the element specification part 142, from among program elements (e.g., coils) of a predetermined form defined in advance, in the case where the contact specification part 141 or the element specification part 142 is no longer able to specify a program element serving as a further search target. Note that since contacts are a type of program element, processing related to specification and display of a causal element is similar to processing related to specification and display of a causal contact.

Second Embodiment

The PC 1 according to one or more embodiments may, in the case where a plurality of causal contacts are specified by the search part 14, display each of the plurality of specified contacts on the display 30 in a discernible state. Hereinafter, a second embodiment will be described.

Figure 6:
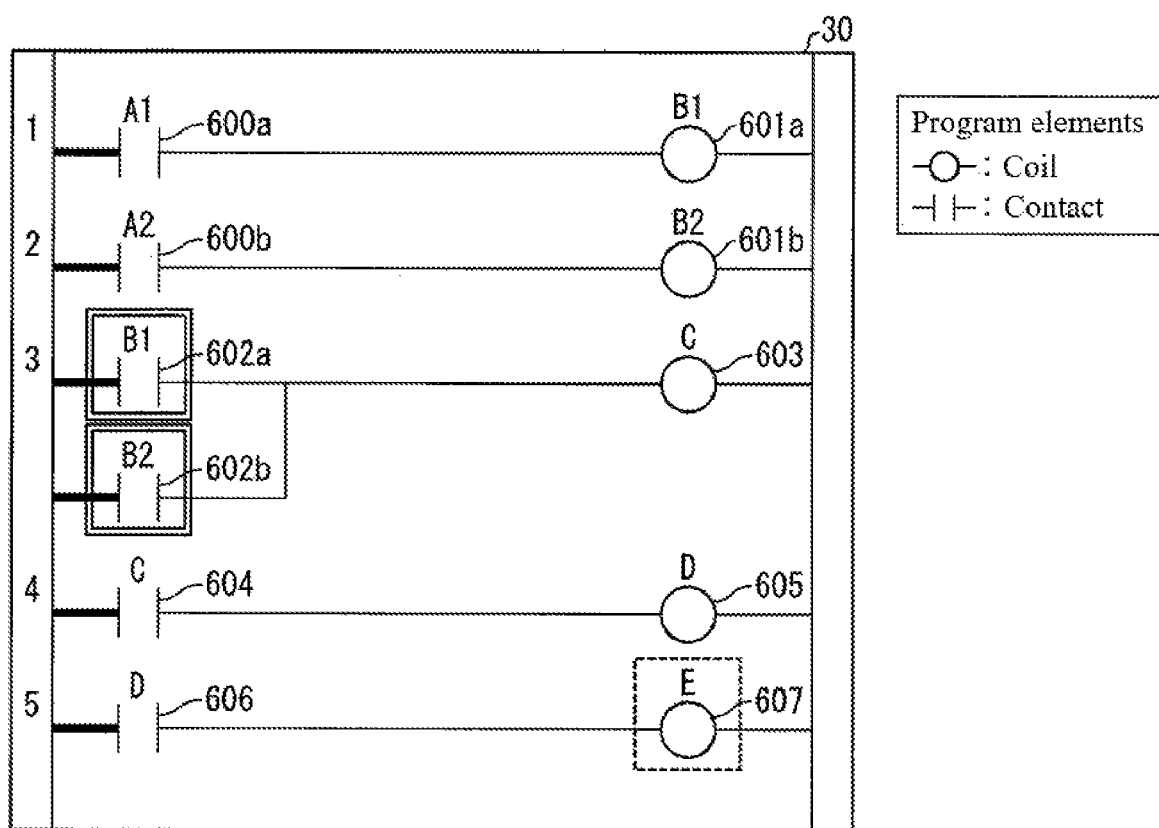
FIG. 6 is a diagram illustrating a ladder diagram corresponding to another example of a ladder program.

FIG. 6 shows a ladder diagram corresponding to another example of the ladder program 51 shown in a first embodiment. Note that the way of reading the ladder diagram shown in FIG. 6 is similar to the ladder diagram shown in FIG. 2. In the ladder diagram shown in FIG. 6, contacts 602*a* and 602*b* have a parallel structure. Also, as illustrated, a variable B1 is allocated to the contact 602*a*, and a variable B2 is allocated to the contact 602*b*. Accordingly, the contact 602*a* changes to an electrically connected state, when the coil 601*a* changes from an electrically disconnected state to an electrically connected state. Also, the contact 602*b* changes to an electrically connected state, when the coil 601*b* changes from an electrically disconnected state to an electrically connected state.

Also, a coil 603 changes to an electrically connected state when at least one of the contacts 602*a* and 602*b* changes to an electrically connected state. In this way, in the case where the ladder program 51 is a program in which a branch point exists in the corresponding ladder diagram, the search part 14 will specify a plurality of causal contacts (contacts 602*a* and 602*b* in the case of FIG. 6) in the process of the causal contact search processing. In this case, the search part 14 displays each of the plurality of specified contacts on the display 30 in a discernible state. For example, as shown in FIG. 6, the respective contacts (contacts 602*a* and 602*b*) may be displayed with framing.

In cases such as where a branch exists in the ladder diagram corresponding to the ladder program 51, the PC 1 is thereby able to indicate a plurality of causal contacts (causal contact candidates) that are conceivably the cause of the first program element being in an electrically disconnected state to the user, improving the convenience of causal contact searches for the user.

Note that the search part 14 may, in the case where the contact specification part 141 specifies a plurality of contacts during the causal contact search processing (i.e., in the case where a branch in the search pattern occurs during the causal contact search processing), convey the plurality of contacts to the display controller 15 instead of a causal contact, and the display controller 15 may display these contacts on the display 30. By allowing the user to select one of the plurality of contacts via the input part 20, the causal contact search processing may then be started again, with the selected contact as the first program element (program element at the start of the causal contact search processing).

Note that the display controller 15 may, in the case where the search part 14 specifies a plurality of causal contacts as described above, display the causal contacts separately in the form of a list or the like, rather than in the ladder diagram in a discernible manner as shown in FIG. 6.

Third Embodiment

The PC 1 according to one or more embodiments may set the ladder program 51 to be executable in the PLC 2, and may acquire, via the communication part (connection part) 40, the electrical connection state of the program elements in the ladder program 51 during execution by the PLC 2. Hereinafter, a third embodiment will be described.

Figure 7:
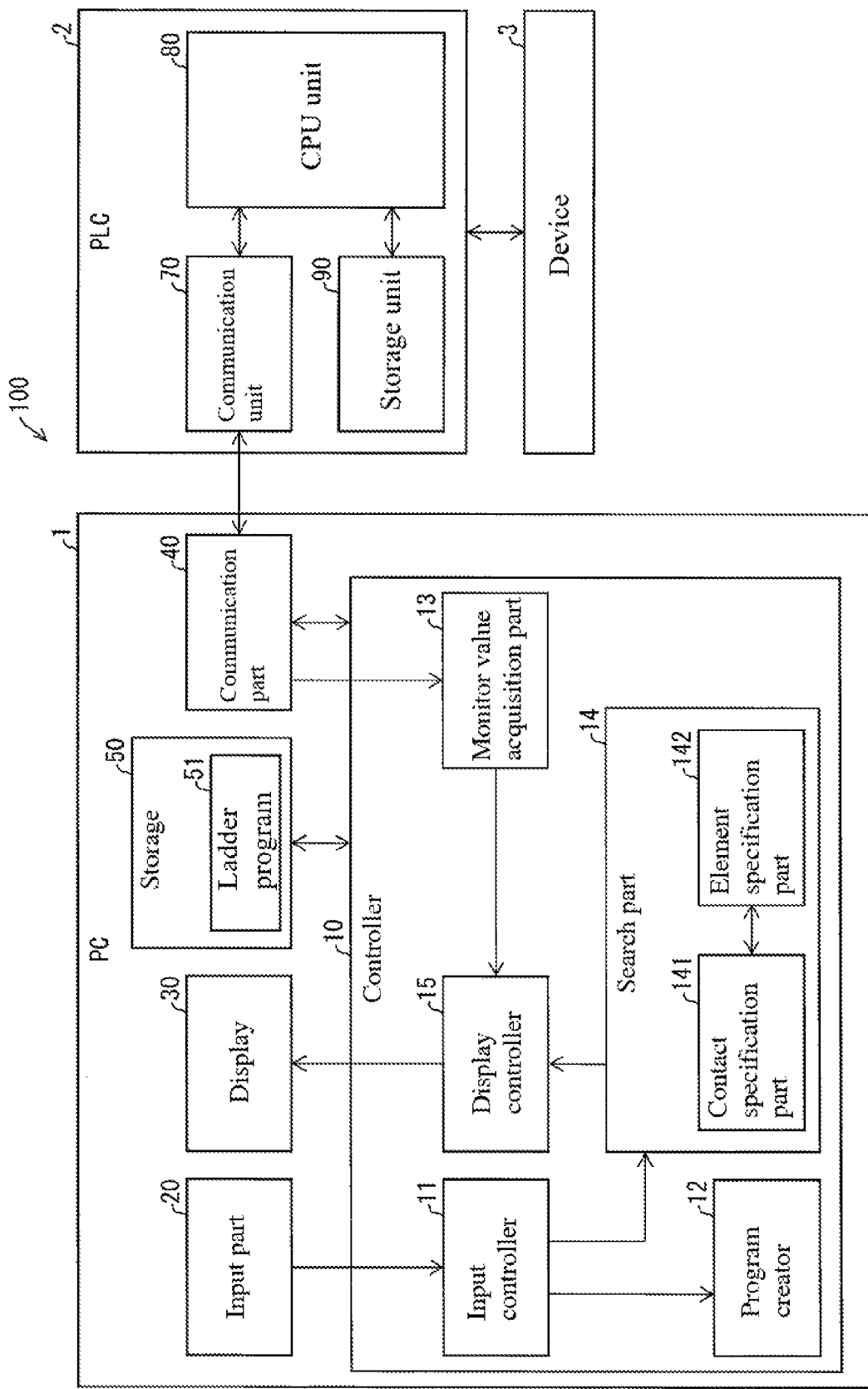
FIG. 7 is a block diagram illustrating the main configuration of a PC and a PLC according to a second embodiment.

FIG. 7 shows the main configuration of the PC 1 and the PLC 2 according to one or more embodiments. The PC 1 according to one or more embodiments differs from the PC 1 according to one or more embodiments in that the functional block of a monitor value acquisition part 13 is realized in the controller 10.

The monitor value acquisition part 13 acquires monitor values from the PLC 2, in accordance with the contents of instructions received from the input controller 11. The monitor values include at least the variable value of the variable allocated to each program element that is included in the ladder program 51. The monitor value acquisition part 13 specifies the electrical connection state of each program element that is included in the ladder program 51, from the variable values that are included in the acquired monitor values, and transmits information indicating the electrical connection state of each program element to the display controller 15. Note that the monitor value acquisition part 13 may receive information specifying the ladder program 51 being executed by the PLC 2 together with the monitor values, and transmit the monitor values and this information to the display controller 15. For example, in the case where a plurality of ladder programs 51 are downloaded to the PLC 2 (i.e., in the case where there are a plurality of patterns of control of the device 3 by the PLC 2), which one of the ladder programs 51 is to be displayed on the PC 1 can be specified, by receiving information designating a ladder program 51.

Also, the CPU unit 80 of the PLC 2 according to one or more embodiments, in the operation mode, acquires information indicating the electrical connection state of various types of components of the device 3 being controlled as monitor values, and transmits the acquired information to the PC 1 via the communication unit 70.

The display controller 15 then reads out the same ladder program 51 as the ladder program 51 that is being executed by the PLC 2 from the storage 50, in accordance with the contents of an instruction from the input controller 11, and displays the electrical connection state of each program element (program element being executed) on the display 30, after having reflected the ladder diagram corresponding to the program and the electrical connection state of each physical component acquired from the monitor value acquisition part 13 in the electrical connection state of the program element.

According to this configuration, the PC 1 is able to locate a problem area (program element in an electrically disconnected state) of the ladder program 51 that occurs when the ladder program 51 is actually executed by the PLC 2, and to search for and specify the cause of this problem area.

Note that the monitor value acquisition part 13 may acquire the electrical connection state of each program element of the ladder program 51 during execution by the PLC 2 at a predetermined time interval, and the display controller 15 may reflect the electrical connection state of the program elements of the ladder program 51 during execution at any time, based on information received from the monitor value acquisition part 13.

The PC 1 is thereby able to reflect the electrical connection state of each physical component of the ladder program 51 during execution by the PLC 2 in the electrical connection state of the program elements in real time. Accordingly, the user is able to locate the problem area (program element that is in an electrically disconnected state) of the ladder program 51 during execution by the PLC 2 in real time, and to search for and specify the causal contact of the problem area in real time.

Fourth Embodiment

The PC 1 according to one or more embodiments may specify a causal element that causes the first program element to be in an electrically connected state. More specifically, the PC 1 according to one or more embodiments may perform first processing for using the first program element as the program element serving as the search target and specifying a second program element that, by being changed to an electrically disconnected state, is capable of changing the program element serving as the search target to an electrically disconnected state, within the same circuit as the program element serving as the search target.

The PC 1 may, in the case where the second program element cannot be specified by the first processing, then determine whether a third program element to which the same variable as the variable allocated to the program element serving as the search target is allocated exists higher than the program element serving as the search target.

If it is determined that a third program element does not exist, the program element serving as the search target may be displayed as the causal element in a state discernible from other program elements, and if it is determined that one third program element exists, the first processing may be performed again with the third program element as the program element serving as the next search target.

Also, the PC 1 may, in the case where one second program element is specified by the first processing, further determine whether a fourth program element to which the same variable as the variable allocated to the second program element is allocated exists higher than the second program element. If it is determined that the fourth program element does not exist, the second program element may then be displayed as the causal element in a state discernible from other program elements, and if it is determined that one fourth program element exists, the first processing may be performed with the fourth program element as the program element serving as the next search target.

Also, the PC 1 may, in the case where there are a plurality of any of the second program element, the third program element or the fourth program element, display the plurality of program elements as causal elements in a state discernible from other program elements. Hereinafter, one or more embodiments will be described using FIGS. 8 and 9.

Figure 8:
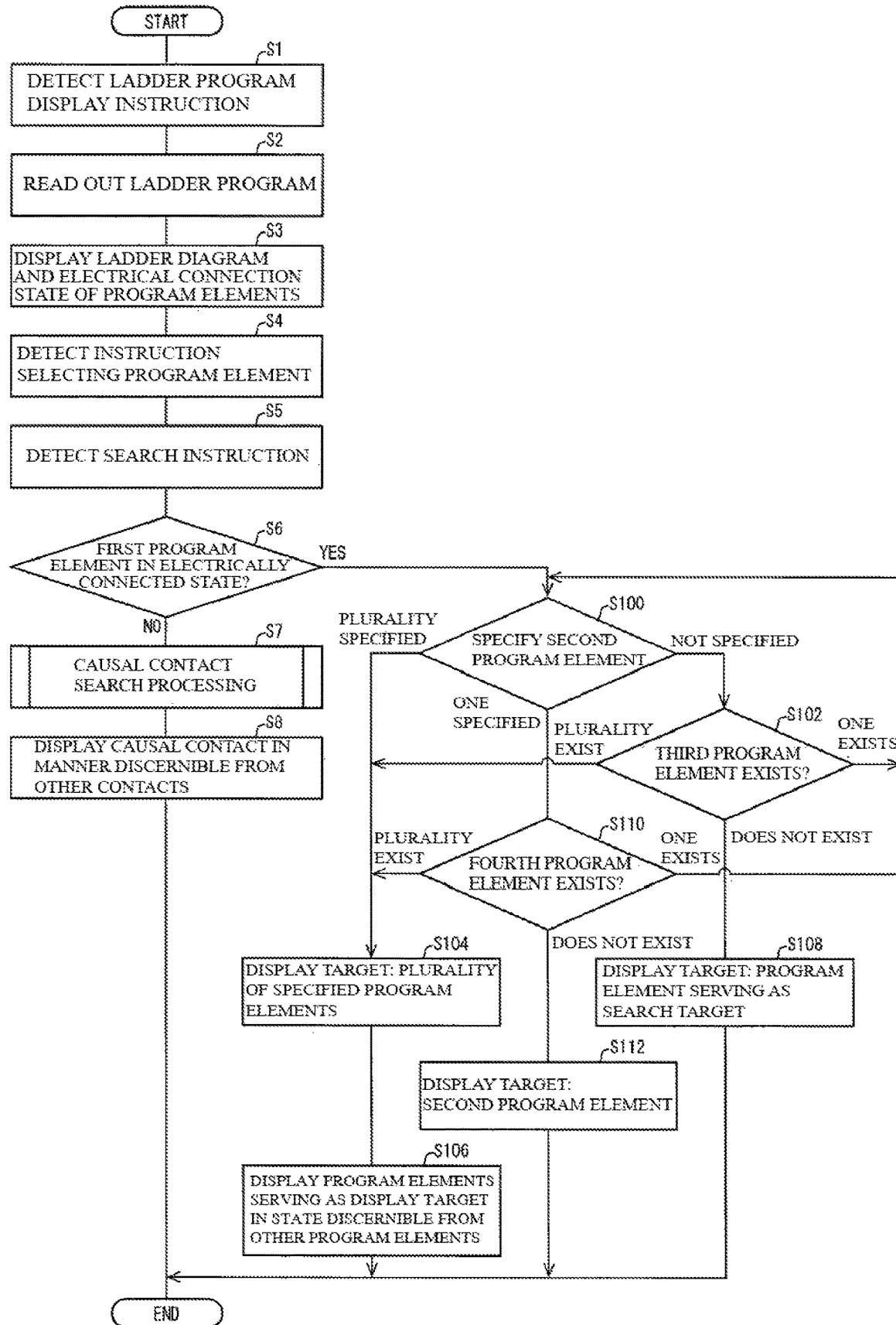
FIG. 8 is a flowchart illustrating an example of the overall flow of processing by a PC according to a fourth embodiment.

FIG. 8 is a flowchart showing an example of the overall flow of processing by the PC 1 according to one or more embodiments. Note that processing other than the processing of S100 to S112, out of the various processing of FIG. 8, is the same processing as the processing given in FIG. 4. The search part 14 according to one or more embodiments, upon receiving an instruction detected in S4 or S5 by the input controller 11, determines whether the program element selected by the user, that is, the first program element, is in an electrically connected state or an electrically disconnected state (S6). If the first program element is in an electrically connected state (YES in S6), the search part 14 first uses the first program element as the program element serving as the search target and specifies a second program element that, by being changed to an electrically disconnected state, is capable of changing the first program element to an electrically disconnected state, within the same circuit as the program element serving as the search target (S100; first processing). Here, a circuit denotes a set of paths along which it is possible to depart from a certain coil connected to the right bus bar in the ladder diagram and arrive at the left bus bar.

If a second program element cannot be specified in S100 ("not specified" in S100), the search part 14 determines whether a program element (third program element) to which the same variable as the variable allocated to the program element serving as the search target is allocated exists higher than the program element serving as the search target (S102).

If one third program element exists ("one exists" in S102), the search part 14 performs the first processing again with the third program element as the program element serving as the next search target (S100). On the other hand, if a plurality of third program element exists ("plurality exist" in S102), the search part 14 conveys these third program elements to the display controller 15 as the display target (S104). The display controller 15 displays these program elements on the display 30 in a state discernible from other program elements in the ladder diagram (S106). Also, if a third program element does not exist ("does not exist" in S102), the search part 14 takes the program element serving as the search target in S100 as the display target (S108). The display controller 15 then performs the processing of S106.

If one second program element is specified in S100 ("one specified" in S100), the search part 14 determines whether a program element (fourth program element) to which the same variable as the variable allocated to the second program element is allocated exists higher than the second program element (S110).

If one fourth program element exists ("one exists" in S110), the search part 14 performs the first processing again with the fourth program element as the program element serving as the next search target (S100). On the other hand, if a plurality of fourth program elements exist ("plurality exist" in S110), the search part 14 conveys these fourth program elements to the display controller 15 as causal elements serving as the display target (S104). The display controller 15 displays these program elements on the display 30 in a state discernible from other program elements in the ladder diagram (S106). Also, if a fourth program element does not exist ("does not exist" by S110), the search part 14 displays the second program element specified in S100 as the causal element (S112). The display controller 15 then performs the processing of S106.

If a plurality of second program element is specified in S100 ("plurality specified" in S100), the search part 14 conveys these second program elements to the display controller 15 as causal elements serving as the display target (S104). The display controller 15 displays these program elements on the display 30 in a state discernible from other program elements in the ladder diagram (S106).

Note that the method of displaying the program elements is not particularly limited, and, for example, the program element serving as the display target may be displayed in a highlighted manner with framing or shading, or the program element serving as the display target may be displayed in a different color from other program elements.

According to the above processing, the PC 1 searches back through the program elements that are in an electrically connected state, and, in the case where one or more causal elements are specified, displays these causal elements in a state discernible from other program elements. Here, "the case where one or more causal elements are specified" includes, for example, cases such as where a plurality of causal element candidates are specified at a place in which the ladder diagram has a parallel or serial structure, or where the highest program element of the first program element is specified as a result of back searching (i.e., the case where there is no higher program element for setting this program element to an electrically disconnected state).

The user, by selecting a program element via the PC 1, is thereby able to easily specify the causal element that is causing the selected program element to be in an electrically connected state. Accordingly, debugging the ladder program 51 or investigating the cause of a fault can be efficiently carried out.

Also, the display controller 15, in the case where a plurality of program elements are displayed in a manner discernible from other program elements as described above, desirably displays these program elements on the display 30 so as to be selectable by the user via the input part 20. In the case where an instruction by the user selecting one program element from the above plurality of program elements is detected, the processing of S100 to S112 may be performed again with the selected program element as the next search target. The user, by sequentially selecting the program elements, is thereby able to trace back upstream and identify the program elements of a ladder diagram. For example, in the case where branching occurs in the ladder diagram, the user is able to select the branch destination at the place where the branching occurs, and search back through the program elements.

Note that, in the case where the first program element is in an electrically disconnected state (NO in S6), the search part 14 may search for and display a causal contact as described in first to third embodiments (S7 and S8).

Figure 9:
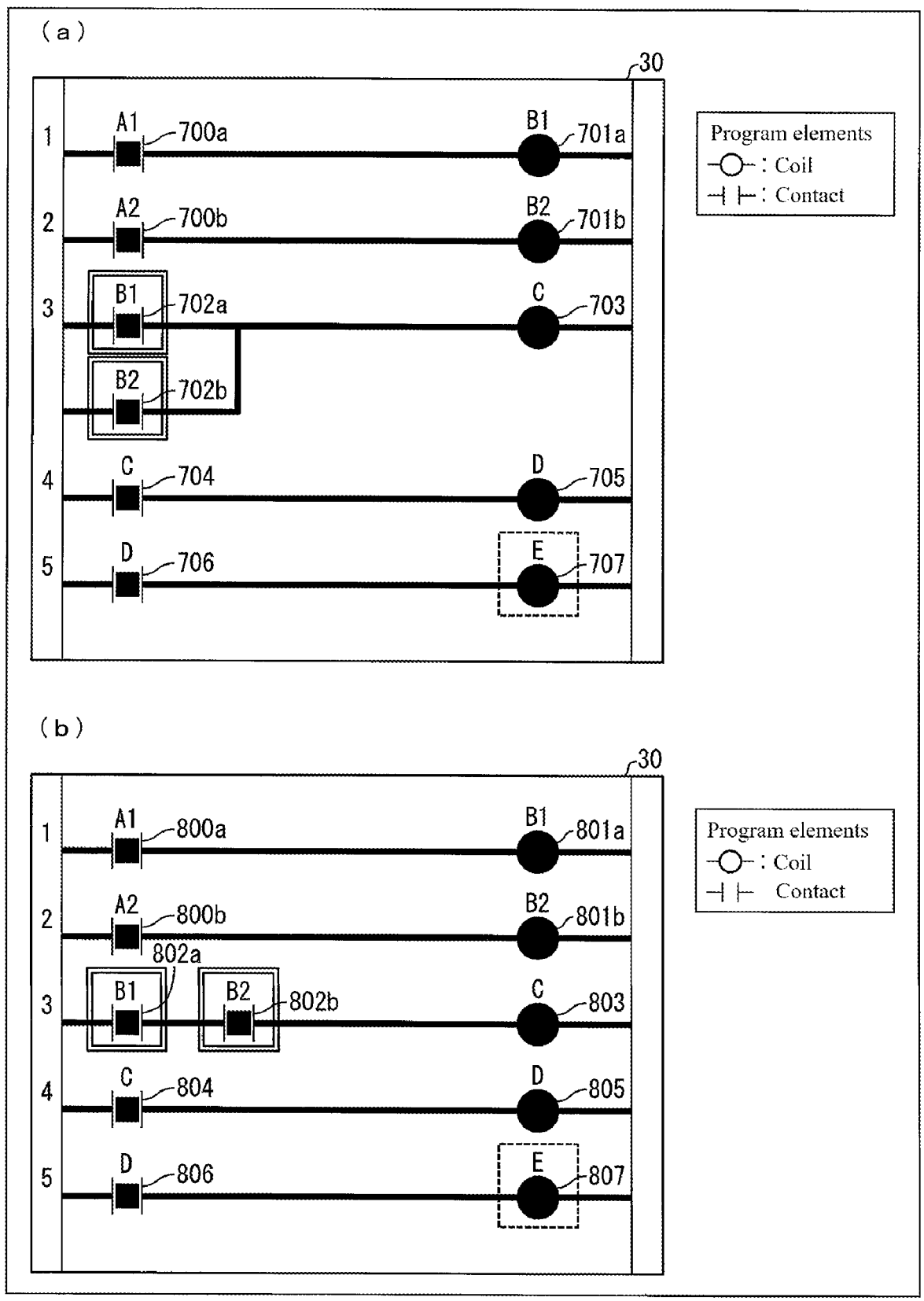
FIG. 9 is (a) a diagram illustrating a specific example of a ladder diagram corresponding to a ladder program related to a fourth embodiment, and (b) a diagram showing a ladder diagram corresponding to another example of a ladder program.

(a) of FIG. 9 is a diagram showing a specific example of a ladder diagram corresponding to the ladder program 51 according to one or more embodiments. In (a) and (b) of FIG. 9, all the program elements are in an electrically connected state. When an input operation selecting a coil 707 is carried out by the user in this state, as shown in (a) of FIG. 9, the input part 20 accepts the input operation, and sends a signal to the input controller 11. The input controller 11 specifies the selected program element (coil 707) from the signal, and conveys this program element to the search part 14.

The search part 14 determines whether the coil 707 is in an electrically connected state or in an electrically disconnected state. In the case of (a) of FIG. 9, since the coil 707 is in an electrically connected state, the search part 14 specifies a second program element within the same circuit as the coil 707. In the example in (a) of FIG. 9, the one contact 706 is specified as a second program element. The search part 14 next determines whether a program element (fourth program element) to which the same variable as the variable allocated to the contact 706 is allocated exists upstream of the contact 706. In the example in (a) of FIG. 9, the one coil 705 to which the same variable D as the contact 706 is allocated is specified. The search part 14 repeats processing similar to the contact 706 for the coil 705.

In this way, in the example in (a) of FIG. 9, in the case where processing is performed with the coil 703 as the program element serving as the search target, two second program elements, namely, a contact 702a and a contact 702b, are specified, when tracing back through the program elements in an electrically connected state. When a plurality of program elements are specified in this way, the display controller 15 displays these program elements (contact 702a and contact 702b) in a manner discernible from other program elements, as shown in (a) of FIG. 9. Note that, as illustrated, the display controller 15 may also display the coil 707, which is the first program element, on the display 30 in a manner discernible from other program elements. In the case where a program element displayed in a discernible manner is selected by the user, back searching may be performed again with the selected program element as the next search target.

(b) of FIG. 9 shows a ladder diagram corresponding to another example of the ladder program 51 according to one or more embodiments. The search part 14 also performs processing for searching back through the program elements that are in an electrically connected state from the first program element in the example in (b) of FIG. 9, as illustrated in the example in (a) of FIG. 9. In the example in (b) of FIG. 9, in the case where processing is performed with a coil 803 as the program element serving as the search target, a contact 802a and a contact 802b are specified in the process of back searching. The display controller 15 then displays the contact 802a and the contact 802b in a manner discernible from other program elements. In the case where a program element displayed in a discernible manner is then selected by the user, back searching may be performed again, with the selected program element as the next search target.

Note that, in the case where the search part 14 specifies program elements serving as the display target as described above, the display controller 15 may display these program elements separately in the form of a list or the like, rather than displaying the respective program elements in the ladder diagram in a discernible manner.

Modifications

In one or more embodiments, the PC 1 was described as a program creation support apparatus provided with a function of creating the ladder program 51. However, the PC 1 need not be provided with a function of creating the ladder program 51, and may read out the ladder program 51 stored in advance in the storage 50, and display a ladder diagram corresponding to the ladder program 51 and the electrical connection state of each program element. The causal element may then be specified from the program elements and displayed in the ladder diagram.

In this case, the program creator 12 is not essential to the PC 1, and the controller 10 of the PC 1 may receive the ladder program 51 from the program creation apparatus of another PC 1 or the like or the PLC 2 via the communication part 40, and store this ladder program in the storage 50. Reading out and display of the stored ladder program 51 may then be performed, in response to an input operation by the user to the input part 20.

Exemplary Realization by Software

The control block (controller 10) of the PC 1 may be realized by a logic circuit (hardware) formed in an integrated circuit (IC chip) or the like, or may be realized by software using a CPU (Central Processing Unit).

In the case of the latter, the PC 1 is provided with a CPU that executes the commands of a program which is software for realizing respective functions, a ROM (Read-Only Memory) or storage device (referred to as "recording media") on which the above program and various types of data are recorded so as to be readable by a computer (or the CPU), a RAM (Random Access Memory) to which the program is extracted, and the like. An object of one or more embodiments is attained, by a computer (or the CPU) reading the program from the recording medium and executing this program. As the above recording medium, "a non-transitory tangible medium", such as a tape, a disk, a card, a semiconductor memory or a programmable logic circuit, for example, can be used. Also, the program may be supplied to the computer via a suitable transmission medium (communication network, broadcast wave, etc.) capable of transmitting the program. Note that one or more embodiments can also be realized in the form of a data signal embedded in a carrier wave in which the program is embodied through digital transmission.

A program creation support apparatus according to one aspect is a program creation support apparatus for supporting creation of a ladder program, including a storage configured to store a ladder program including a plurality of program elements, and a processor configured to read out the ladder program from the storage and execute the read ladder program, the processor being configured to display, on a display, a ladder diagram corresponding to the ladder program and whether each program element at a time of executing the ladder program is in an electrically connected state or an electrically disconnected state, in association with the ladder diagram, detect a user instruction selecting a first program element from the program elements displayed on the display, determine whether the first program element is in an electrically connected state or an electrically disconnected state, specify, according to whether the first program element is in an electrically connected state or an electrically disconnected state, one or more causal elements that cause the first program element to be in the electrically connected state or the electrically disconnected state, and display, on the display, the specified one or more causal elements in the ladder diagram in a state discernible from other program elements.

A control method for a program creation support apparatus according to one aspect is a control method for a program creation support apparatus that supports creation of a ladder program, the method including a processing step of reading out a ladder program including a plurality of program elements from a storage configured to store the ladder program and executing the read ladder program, and the processing step including a ladder diagram display step of displaying, on a display, a ladder diagram corresponding to the ladder program and whether each program element at a time of executing the ladder program is in an electrically connected state or an electrically disconnected state, in association with the ladder diagram, a detection step of detecting a user instruction selecting a first program element from the program elements displayed on the display, a determination step of determining whether the first program element is in an electrically connected state or an electrically disconnected state, a program element specification step of specifying, according to whether the first program element is in an electrically connected state or an electrically disconnected state, one or more causal elements that cause the first program element to be in the electrically connected state or the electrically disconnected state, and a program element display step of displaying, on the display, the one or more causal elements specified in the program element specification step in the ladder diagram in a state discernible from other program elements.

A control program for a program creation support apparatus according to one aspect is a control program for a program creation support apparatus that supports creation of a ladder program, the program including a processing step of reading out a ladder program including a plurality of program elements from a storage configured to store the ladder program and executing the read ladder program, and the processing step including a ladder diagram display step of displaying, on a display, a ladder diagram corresponding to the ladder program and whether each program element at a time of executing the ladder program is in an electrically connected state or an electrically disconnected state, in association with the ladder diagram, a detection step of detecting a user instruction selecting a first program element from the program elements displayed on the display, a determination step of determining whether the first program element is in an electrically connected state or an electrically disconnected state, a program element specification step of specifying, according to whether the first program element is in an electrically connected state or an electrically disconnected state, one or more causal elements that cause the first program element to be in the electrically connected state or the electrically disconnected state, and a program element display step of displaying, on the display, the one or more causal elements specified in the program element specification step in the ladder diagram in a state discernible from other program elements.

According to the above configurations, the program creation support apparatus specifies, in the case where the first program element selected by the user is in an electrically connected state, one or more causal elements that cause this program element to be in the electrically connected state. Also, the program creation support apparatus specifies, in the case where the first program element is in an electrically disconnected state, a causal element that causes this program element to be in the electrically disconnected state. The program creation support apparatus then presents the specified causal elements to the user.

The user, by selecting a certain program element via the program creation support apparatus, is thereby easily able to specify a program element that causes the selected program element to be in an electrically connected state or an electrically disconnected state. Accordingly, debugging a ladder program or investigating the cause of a fault can be efficiently carried out.

In the above program creation support apparatus, the processor may be configured to, in a case where the first program element is in an electrically disconnected state, repeatedly specify, as a program element serving as a next search target, a program element that, by being changed to an electrically connected state, is capable of changing the first program element to an electrically connected state, and specify, based on the program element serving as the search target, a program element serving as a next search target thereafter, specify, in a case where a program element serving as the next search target cannot be specified, a program element specified immediately before, as the causal element that causes the first program element to be in an electrically disconnected state, and display, on the display, the specified causal element in the ladder diagram in a state discernible from other program elements.

According to the above configuration, the program creation support apparatus, by automatically searching back sequentially through higher program elements that are in an electrically disconnected state from the first program element selected by the user, is able to specify the causal element that originally caused the first program element to be in an electrically disconnected state, and to indicate the causal element to the user. Accordingly, the program creation apparatus is able to automatically specify the cause of a specific program element of a ladder program being in an electrically disconnected state, and can indicate the cause to the user.

In the above program creation support apparatus, the processor may be configured to, in a case where a plurality of causal elements are specified, display the plurality of specified causal elements on the display in a discernible state.

According to the above configuration, the program creation support apparatus is able to indicate a plurality of causal elements to the user. In cases such as where a branch exists in the ladder diagram corresponding to the ladder program, for example, a plurality of causal elements (causal element candidates) that are conceivably the cause of the first program element being in an electrically disconnected state can thereby be indicated to the user, improving the convenience of causal element searches for the user.

In the above program creation support apparatus, in a case where the first program element is in an electrically connected state, the processor may be configured to, using the first program element as a program element serving as a search target, perform first processing for specifying a second program element that, by being changed to an electrically disconnected state, is capable of changing the program element serving as the search target to an electrically disconnected state, within the same circuit as the program element serving as the search target, determine, in a case where the second program element cannot be specified by the first processing, whether a third program element to which the same variable as a variable allocated to the program element serving as the search target is allocated exists higher than the program element serving as the search target, determine, in a case where one second program element is specified by the first processing, whether a fourth program element to which the same variable as a variable allocated to the second program element is allocated exists higher than the second program element, display the program element serving as the search target in a state discernible from other program elements in a case where the third program element does not exist, and display the second program element in a state discernible from other program elements in a case where the fourth program element does not exist, perform, in a case where one third program element or one fourth program element exists, the first processing again with the third program element or the fourth program element as a program element serving as a next search target, and display, in a case where a plurality of any of the second program element, the third program element or the fourth program element are specified, the plurality of program elements as causal elements in a state discernible from other program elements.

According to the above configuration, the program creation support apparatus searches back through the program elements that are in an electrically connected state. The program creation support apparatus then, in the case where one or more causal elements are specified, displays these causal elements in a state discernible from other program elements. Here, "the case where one or more causal elements are specified" includes, for example, cases such as where a plurality of causal element candidates are specified at a place in which the ladder diagram has a parallel or serial structure, or where the highest program element of the first program element is specified as a result of back searching (i.e., the case where there is no higher program element for setting this program element to an electrically disconnected state).

The user, by selecting a program element via the program creation support apparatus, is thereby able to easily specify the causal element that is causing the selected program element to be in an electrically connected state. Accordingly, debugging of a ladder program or investigating the cause of a fault can be efficiently carried out.

In the above program creation support apparatus, the processor may be configured to, in a case where a user instruction selecting one program element from the causal elements displayed on the display in a discernible manner is detected, perform the first processing again, with the selected causal element as the next search target.

According to the above configuration, the program creation support apparatus further attempts to perform the first processing on the selected causal element. The user, by sequentially selecting the displayed causal elements, is thereby able to trace back and identify a causal element that is upstream of the selected causal element.

The program creation support apparatus may further include a connection part configured to connect to a programmable logic controller, the processor may be configured to set the ladder program to be executable by the programmable logic controller via the connection part instead of by the processor, and acquire an electrical connection state of each program element in the ladder program during execution by the programmable logic controller.

According to the above configuration, the program creation support apparatus is able to check whether each program element in a ladder program during execution by a programmable logic controller is in an electrically connected state or an electrically disconnected state. Accordingly, the user is able to locate, in real time, a branch area or a fault area (program element in an electrically disconnected state) that occurs when the ladder program is actually executed by a programmable logic controller, and to search for and specify the cause of this area.

In the above program creation support apparatus, the processor may be configured to acquire the electrical connection state of each program element at a predetermined time interval, and display the acquired electrical connection state of each program element on the display.

According to the above configuration, the program creation support apparatus is able to monitor the ladder program during execution by a programmable logic controller in real time, and also to update whether each program element of the ladder program is in an electrically connected state or an electrically disconnected state at a predetermined time interval. Accordingly, the user is able to locate a problem area (program element in an electrically disconnected state) of the ladder program during execution by the programmable logic controller in real time, and to search for and specify the cause of the problem area in real time.

The present invention is not limited to the foregoing embodiments, and various changes can be made within the scope defined by the claims, and embodiments obtained by appropriately combining technical means respectively disclosed in different embodiments are also intended to be embraced within the technical scope of the invention.

INDEX TO THE REFERENCE NUMERALS

1 PC (program creation support apparatus)
10 Controller (processor)
11 Input controller
12 Program creator
13 Monitor value acquisition part
14 Search part
141 Contact specification part
142 Element specification part
15 Display controller
20 Input part
30 Display
40 Communication part (connection part)
50 Storage
51 Ladder program
2 PLC (programmable logic controller)
70 Communication unit
80 CPU unit
90 Storage unit
3 Device

The invention claimed is:

1. A program creation support apparatus for supporting creation of a ladder program, comprising:
a memory storing the ladder program, the ladder program comprising a plurality of program elements; and
a processor configured with a control program to read and execute the ladder program to perform operations comprising:
displaying, on a display, a ladder diagram corresponding to the ladder program and whether each of the plurality of program elements at a time of executing the ladder program is in an electrically connected state or an electrically disconnected state, in association with the ladder diagram,
detecting a user instruction selecting a first program element from the plurality of program elements displayed on the display,
determining whether the first program element is in an electrically connected state or an electrically disconnected state,
specifying, according to whether the first program element is in an electrically connected state or an electrically disconnected state, one or more causal elements that cause the first program element to be in the electrically connected state or the electrically disconnected state, and
displaying, on the display, the specified one or more causal elements in the ladder diagram in a state in which the specified one or more causal elements are discernable from the plurality of program elements displayed on the display, wherein
in response to the first program element being in an electrically connected state, the processor is configured with the control program to perform operations further comprising, using the first program element as a program element serving as a search target:
performing first processing for specifying a second program element that, by being changed to an electrically disconnected state, is capable of changing the program element serving as the search target to an electrically disconnected state, within the same circuit as the program element serving as the search target,
determining, in response to the second program element being unable to be specified by the first processing, whether a third program element, to which the same variable as a variable allocated to the program element serving as the search target is allocated, is higher in the ladder program than the program element serving as the search target,
determining, in response to one second program element being specified by the first processing, whether a fourth program element to which the same variable as a variable allocated to the second program element is allocated is higher in the ladder program than the second program element,
displaying the program element serving as the search target in a state discernible from the plurality of program elements displayed on the display in response to the third program element not existing, and displaying the second program element in a state discernible from the plurality of program elements displayed on the display in response to the fourth program element not existing,
performing, in response to one third program element or one fourth program element existing, the first processing again with the third program element or the fourth program element as a program element serving as a next search target, and
displaying, in response to a plurality of second program elements, the third program element or the fourth program element are specified, the plurality of program elements as causal elements in a state discernible from the plurality of program elements displayed on the display.

2. The program creation support apparatus according to claim 1,
wherein the processor is configured with the control program to perform operations further comprising:
in a case where the first program element is in an electrically disconnected state, repeatedly specifying, as a program element serving as a next search target, a program element that, by being changed to an electrically connected state, is capable of changing the first program element to an electrically connected state, and specifying, based on the program element serving as the search target, a program element serving as a next search target thereafter,
specifying, in a case where a program element serving as the next search target cannot be specified, a program element specified immediately before, as the causal element that causes the first program element to be in an electrically disconnected state, and
displaying, on the display, the specified causal element in the ladder diagram in a state discernible from the plurality of program elements displayed on the display.

3. The program creation support apparatus according to claim 2,
wherein the processor is configured with the control program to perform operations further comprising, in a case where a plurality of causal elements are specified, displaying the plurality of specified causal elements on the display in a state discernible from the plurality of program elements displayed on the display.

4. The program creation support apparatus according to claim 1,
wherein the processor is configured with the control program to perform operations comprising, in a case where a user instruction selecting one program element from the causal elements displayed on the display in a discernible manner is detected, performing the first processing again, with the selected causal element as the next search target.

5. The program creation support apparatus according to claim 1, further comprising:
a connection part connected to a programmable logic controller,
wherein the processor is configured with the control program to perform operations comprising
setting the ladder program to be executable by the programmable logic controller via the connection part instead of by the processor, and
acquiring an electrical connection state of each program element in the ladder program during execution by the programmable logic controller.

6. The program creation support apparatus according to claim 5,
wherein the processor is configured with the control program to perform operations comprising:
acquiring the electrical connection state of each of the plurality of program elements at a predetermined time interval, and
displaying the acquired electrical connection state of each program element on the display.

7. A control method for a program creation support apparatus that supports creation of a ladder program, the method comprising:
reading out, by a processor, a ladder program comprising a plurality of program elements from a memory storing the ladder program and executing the read ladder program,
displaying, by the processor on a display, a ladder diagram corresponding to the ladder program and whether each of the plurality of program elements at a time of executing the ladder program is in an electrically connected state or an electrically disconnected state, in association with the ladder diagram;
detecting, by the processor, a user instruction selecting a first program element from the plurality of program elements displayed on the display;
determining, by the processor, whether the first program element is in an electrically connected state or an electrically disconnected state;
specifying, by the processor, according to whether the first program element is in an electrically connected state or an electrically disconnected state, one or more causal elements that cause the first program element to be in the electrically connected state or the electrically disconnected state; and
displaying, by the processor on the display, the specified one or more causal elements in the ladder diagram in a state discernible from the plurality of program elements displayed on the display, wherein
in response to the first program element being in an electrically connected state, the processor is configured with the control program to perform operations further comprising, using the first program element as a program element serving as a search target:
performing first processing for specifying a second program element that, by being changed to an electrically disconnected state, is capable of changing the program element serving as the search target to an electrically disconnected state, within the same circuit as the program element serving as the search target,
determining, in response to the second program element being unable to be specified by the first processing, whether a third program element, to which the same variable as a variable allocated to the program element serving as the search target is allocated, is higher in the ladder program than the program element serving as the search target,
determining, in response to one second program element being specified by the first processing, whether a fourth program element to which the same variable as a variable allocated to the second program element is allocated is higher in the ladder program than the second program element,
displaying the program element serving as the search target in a state discernible from the plurality of program elements displayed on the display in response to the third program element not existing, and displaying the second program element in a state discernible from the plurality of program elements displayed on the display in response to the fourth program element not existing,
performing, in response to one third program element or one fourth program element existing, the first processing again with the third program element or the fourth program element as a program element serving as a next search target, and
displaying, in response to a plurality of second program elements, the third program element or the fourth program element are specified, the plurality of program elements as causal elements in a state discernible from the plurality of program elements displayed on the display.

8. A non-transitory computer-readable recording medium storing a control program for a program creation support apparatus that supports creation of a ladder program, the program when read and executed by a processor, causing the processor to perform operations comprising:
reading out a ladder program comprising a plurality of program elements from a memory storing the ladder program and executing the read ladder program,
displaying, on a display, a ladder diagram corresponding to the ladder program and whether each of the plurality of program elements at a time of executing the ladder program is in an electrically connected state or an electrically disconnected state, in association with the ladder diagram;
detecting a user instruction selecting a first program element from the plurality of program elements displayed on the display;
determining whether the first program element is in an electrically connected state or an electrically disconnected state;
specifying, according to whether the first program element is in an electrically connected state or an electrically disconnected state, one or more causal elements that cause the first program element to be in the electrically connected state or the electrically disconnected state; and
displaying, on the display, the specified one or more causal elements in the ladder diagram in a state discernible from the plurality of program elements displayed on the display, wherein
in response to the first program element being in an electrically connected state, the processor is configured with the control program to perform operations further comprising, using the first program element as a program element serving as a search target:
performing first processing for specifying a second program element that, by being changed to an electrically disconnected state, is capable of changing the program element serving as the search target to an electrically disconnected state, within the same circuit as the program element serving as the search target, determining, in response to the second program element being unable to be specified by the first processing, whether a third program element, to which the same variable as a variable allocated to the program element serving as the search target is allocated, is higher in the ladder program than the program element serving as the search target, determining, in response to one second program element being specified by the first processing, whether a fourth program element to which the same variable as a variable allocated to the second program element is allocated is higher in the ladder program than the second program element, displaying the program element serving as the search target in a state discernible from the plurality of program elements displayed on the display in response to the third program element not existing, and displaying the second program element in a state discernible from the plurality of program elements displayed on the display in response to the fourth program element not existing, performing, in response to one third program element or one fourth program element existing, the first processing again with the third program element or the fourth program element as a program element serving as a next search target, and displaying, in response to a plurality of second program elements, the third program element or the fourth program element are specified, the plurality of program elements as causal elements in a state discernible from the plurality of program elements displayed on the display.

* * * * *